United States Patent
Wei et al.

(10) Patent No.: US 10,549,465 B2
(45) Date of Patent: Feb. 4, 2020

(54) INJECTION MOLD WITH THERMOELECTRIC ELEMENTS

(71) Applicant: SABIC Global Technologies B.V., Bergen op Zoom (NL)

(72) Inventors: Yan Wei, Kunshan (CN); Shipu Cao, Shanghai (CN); Qingya Shen, Kunshan (CN); Xin Kong, Shanghai (CN)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 0 days.

(21) Appl. No.: 15/126,930

(22) PCT Filed: Mar. 19, 2015

(86) PCT No.: PCT/IB2015/052026
§ 371 (c)(1),
(2) Date: Sep. 16, 2016

(87) PCT Pub. No.: WO2015/140753
PCT Pub. Date: Sep. 24, 2015

(65) Prior Publication Data
US 2017/0113388 A1     Apr. 27, 2017

Related U.S. Application Data

(60) Provisional application No. 61/955,596, filed on Mar. 19, 2014.

(51) Int. Cl.
*B29C 45/73* (2006.01)
*B29C 33/02* (2006.01)
*B29C 33/38* (2006.01)

(52) U.S. Cl.
CPC .............. *B29C 45/73* (2013.01); *B29C 33/02* (2013.01); *B29C 45/7331* (2013.01);
(Continued)

(58) Field of Classification Search
CPC ........ B29C 45/7331; B29C 2045/7368; B29C 33/02; B29C 33/38; B29C 45/73; B29C 45/40; B29K 2909/02
(Continued)

(56) References Cited

U.S. PATENT DOCUMENTS 3,661,487 A   5/1972  Susin
3,804,362 A   4/1974  Stromblad et al.
(Continued)

FOREIGN PATENT DOCUMENTS

CN   203344286        12/2013
DE   29707376 U1       7/1997
(Continued)

OTHER PUBLICATIONS

DE29707376U1—Machine Translation.*
(Continued)

*Primary Examiner* — Matthew J Daniels
*Assistant Examiner* — Yunju Kim
(74) *Attorney, Agent, or Firm* — Cantor Colburn LLP

(57) ABSTRACT

In some embodiments, an injection molding apparatus comprises: a first mold section comprising a first molding surface, wherein the first mold section is configured for attachment to a presser; a second mold section and disposed opposite the first mold section, a thermoelectric device disposed in one of the first and second mold sections and in thermal communication with at least one of the first and second mold surfaces; an electrical control system disposed in electrical communication with the thermoelectric device; the presser in mechanical communication with the first mold section and configured to move at least one of the first and second mold sections toward the other to define a molding space; and an injector for introducing a material to be molded into the molding space; wherein at least one of the
(Continued)

first and second mold sections is formed from a ceramic material.

21 Claims, 4 Drawing Sheets

(52) U.S. Cl.
CPC ...... *B29C 33/38* (2013.01); *B29C 2045/7368* (2013.01); *B29K 2909/02* (2013.01)

(58) Field of Classification Search
USPC .................................................. 264/404, 328
See application file for complete search history.

(56) References Cited

U.S. PATENT DOCUMENTS

| | | | |
|---|---|---|---|
| 5,176,839 A | | 1/1993 | Kim |
| 5,340,528 A | * | 8/1994 | Machida ................. B29C 45/40 264/328.7 |
| 7,914,271 B2 | | 3/2011 | Plumpton |
| 8,003,879 B2 | | 8/2011 | Erbstoeszer et al. |
| 2003/0015308 A1 | | 1/2003 | Fosaaen et al. |

FOREIGN PATENT DOCUMENTS

| | | |
|---|---|---|
| DE | 102008022075 A1 | 11/2009 |
| JP | H03112622 A | 5/1992 |
| JP | H1052842 A | 2/1998 |
| KR | 20080039683 A | 5/2008 |
| KR | 100873667 B1 | 12/2008 |
| KR | 1020090090059 A | 8/2009 |
| WO | 2007121934 A1 | 11/2007 |
| WO | WO-2014114338 A1 * 7/2014 ............. B29C 33/02 |

OTHER PUBLICATIONS

International Search Report for International Application No. PCT/IB2015/052026; International Filing Date: Mar. 19, 2015; dated May 21, 2015; 5 Pages.

Nardin, B. et al. "Adaptive System for Electrically Driven Thermoregulation of Moulds for Injection Moulding", Journal of Materials Processing Technology, 2007, vol. 187-188, pp. 690-693.

Written Opinion for International Application No. PCT/IB2015/052026; International Filing Date: Mar. 19, 2015; dated May 21, 2015; 7 Pages.

* cited by examiner

INJECTION MOLD WITH THERMOELECTRIC ELEMENTS

CROSS REFERENCE TO RELATED APPLICATIONS

This application is a 371 of International Application No PCT/IB2015/052026, filed Mar. 19, 2015, which claims the benefit of Provisional Application No. 61/955,596, filed Mar. 19, 2014, both of which are incorporated by reference in their entirety herein.

BACKGROUND

In injection molding, granular molding material can be fed by gravity from a hopper into a heated barrel. The granules can be slowly advanced by a screw, which can aid in melting the molding material due to frictional heat cause by shear forces within the material. The molding material can be forced into a heated chamber, where it can be melted. The melted molding material can be forced through an injector that rests against the mold such that the material can enter the mold through a gate and runner system to a mold cavity. The mold can be kept cold by circulating a heat transfer fluid through the mold walls adjacent the cavity so the molding material solidifies as the mold is filled.

The mold can have a number of important sections. Molten material, called the melt, can enter the mold through a sprue, or channel, formed in the mold, e.g., along a mold surface or through the mold section. A sprue bushing can be tightly sealed against the injector of the injection device. A channel can be called a runner. The runner can connect to the sprue. The runner can guide the melt to the part forming mold cavity. The location at which the molten material enters the part forming mold cavity is called the gate. The amount of resin required to fill the sprue, runner, and part forming mold cavity, or cavities, of a mold is sometimes known as a "shot". Hot melt can cool as it flows to the part forming mold cavity, as it flows along and/or within the mold sections. Thermal energy removed from the melt can travel to an ancillary cooling system. An ancillary cooling system can include a fluid heat exchange circuit in thermal communication with a mold section. An ancillary cooling system can include a fluid heat exchange circuit in fluid communication with a mold section. An ancillary cooling system can include a fluid heat exchange circuit in fluid communication and thermal communication with a mold section. As the melt cools, the inner section of the melt, farther from cool mold walls, can continue to flow and fill the mold cavity. The injector can pressurize the melt to eliminate gas bubbles. The injector can force the cooling melt against the mold cavity walls. The injector pressure can be maintained while the part solidifies. The injector pressure can be increased while the part solidifies. The injector pressure can be decreased while the part solidifies.

Challenges in injection molding can arise from controlling the temperature of a mold during each phase of the process and in every area that the plastic contacts. If a mold temperature is not controlled properly then a variety of part defects can result. If a mold temperature is not uniformly controlled then a variety of part defects can result. A temperature control system for a molding operation can be complex and can be capital intensive. A temperature control system for a molding operation can have significant customization to a particular mold design. A temperature control system for a molding operation can be inefficient. Thus there is a need in the art for a mold design that can improve control of mold temperatures, improve efficiency, and can reduce capital cost.

SUMMARY

The present inventors have recognized, among other things, that a problem to be solved can include efficient control of mold temperatures in an injection molding apparatus. The present subject matter can help provide a solution to this problem, such as by providing a thermoelectric device which can heat or cool a mold surface based on the direction of current flow through the device. Thermoelectric devices can reduce the heat loss of a temperature control system such as by localizing the temperature control function to a mold section.

In some embodiments, an injection molding apparatus can comprise: a first mold section comprising a first molding surface, wherein the first mold section is configured for attachment to a presser; a second mold section comprising a second molding surface and disposed opposite the first mold section, wherein the first and second molding surfaces face one another; a thermoelectric device disposed in one of the first and second mold sections and in thermal communication with at least one of the first and second mold surfaces; an electrical control system disposed in electrical communication with the thermoelectric device; the presser in mechanical communication with the first mold section and configured to move at least one of the first and second mold sections toward the other to define a molding space; and an injector for introducing a material to be molded into the molding space; wherein at least one of the first and second mold sections is formed from a ceramic material.

In some embodiments, a method of injection molding can comprise: forming a molding space between two mold sections, wherein at least one of the mold sections is made of a ceramic material; heating at least one of the mold sections with a thermoelectric device by flowing an electric current through the thermoelectric device in a first direction; introducing a material to be molded into the molding space; cooling the material to be molded to form a molded part; exiting the part from the part forming mold cavity.

In some embodiments, an injection molding apparatus can comprise: a first mold section comprising a first molding surface, wherein the first mold section is configured for attachment to a presser; a second mold section comprising a second molding surface and disposed opposite the first mold section, wherein the first and second molding surfaces face one another; a first thermoelectric device disposed in the first mold section and in thermal communication with the first mold surface; a second thermoelectric device disposed in the second mold section and in thermal communication with the second mold surface; an electrical control system disposed in electrical communication with both the first and second thermoelectric devices; the presser in mechanical communication with the first mold section and configured to move the first mold section toward the second mold section to define a molding space, wherein the second molding surface is stationary; and an injector for introducing a material to be molded into the molding space; wherein at least one of the first and second mold sections is formed from a ceramic material.

This summary is intended to provide a summary of subject matter of the present patent application. It is not intended to provide an exclusive or exhaustive explanation of the invention. The detailed description is included to provide further information about the present patent application.

BRIEF DESCRIPTION OF THE DRAWINGS

Refer now to the figures, which are exemplary embodiments, and wherein the like elements are numbered alike.

Figure 1:
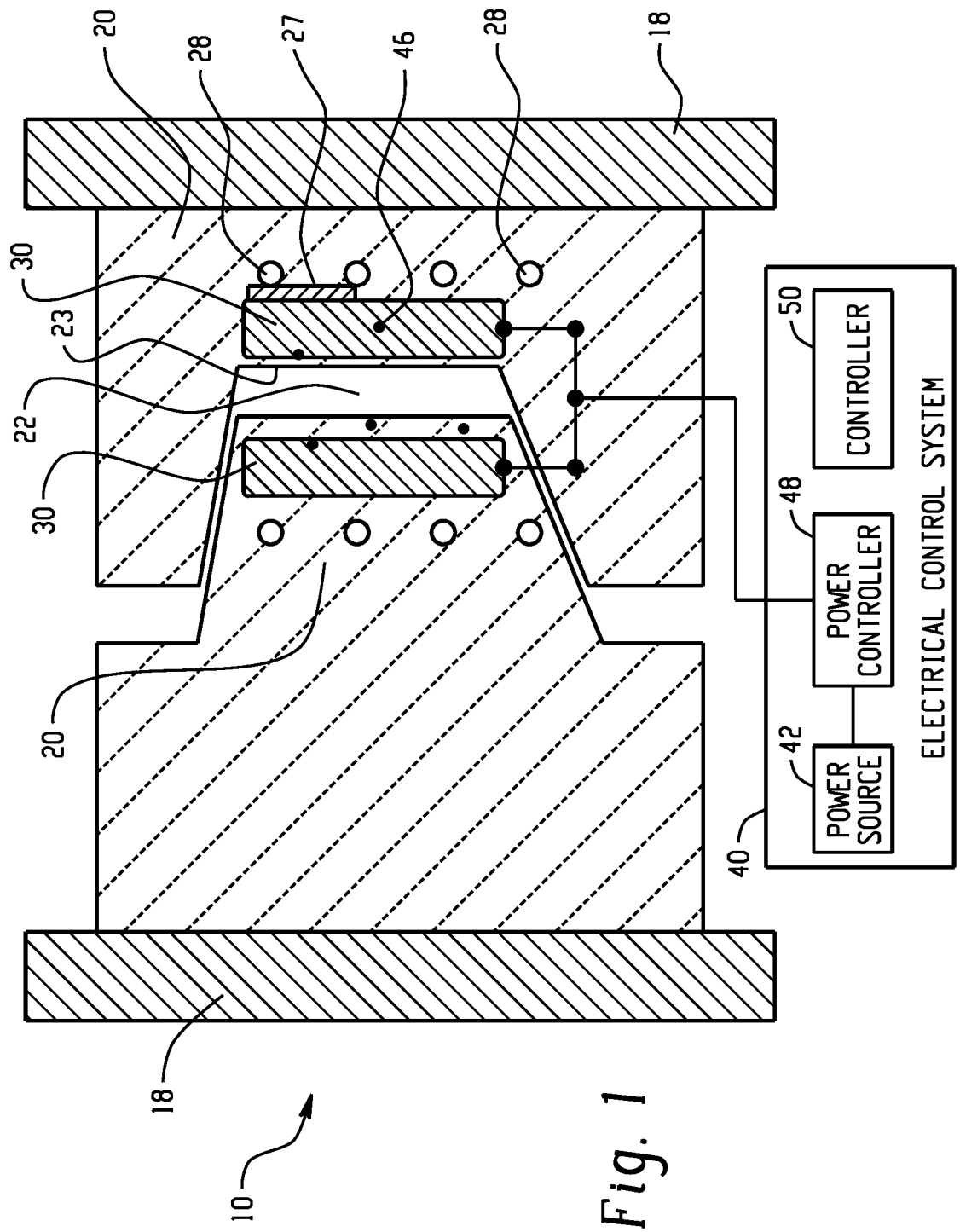
FIG. 1 is an illustration of a side view of a partially open injection molding apparatus with thermoelectric devices.

The figures are exemplary only and are not drawn to a particular scale.

DETAILED DESCRIPTION

Disclosed herein are molds, such as ceramic molds, including thermoelectric devices. The devices can control the surface temperatures within the mold cavity. The devices can actively control the temperature, such as through the use of feedback. They can also passively control the surface temperatures. Controlling the mold temperatures in a precise fashion can improve part quality (e.g., dimensional consistency from part to part). Rapid control of mold temperature can contribute to shorter cycle times.

In molding plastic parts, two or more mold sections, each having a detachable or integral molding surface, can be pressed together to define a molding space, including a part forming mold cavity and an injection passage, or channel. A molten plastic material can be introduced into one or more part forming mold cavities through the injection passage, which is sometimes called a runner. In the runner molten plastic can run along surfaces of the passage as it makes its way through to the part forming mold cavity. During the introduction stage of the molding process the plastic is in a fluid phase. As the plastic flows through the passage it touches the passage walls in the runner(s) and cools. Portions of the flow, adjacent the passage walls solidify and narrow the flow area within the passage. This can restrict the flow of remaining plastic material entering the mold cavity. To overcome this reduction in flow area, the injection pressure can be increased to continue to push molten plastic into the mold. This can lead to high injection pressure. In an example, the injection pressure can rise from 50 bar to 170 bar when the melt passes the runner and enters the mold cavity.

As molten plastic touches the molding surfaces it transfers heat into the mold sections. A mold section can include cooling channels or passages to allow a heat transfer fluid to circulate through the mold section to maintain the molding surface at a desired temperature. In a heat exchange circuit of this type, thermal energy from the mold section can be transferred into a heat transfer fluid. The heat transfer fluid can transfer thermal energy to a second heat transfer fluid in a separate heat exchanger. The temperature profile across the molding surface can be difficult to adjust using fluid based heat exchange of this type, at least because the fluid flow through each passage can have a fixed relationship to the total fluid flow. To address this shortcoming, heat exchange circuits can be complicated.

Complicated circuits can include valves, orifices, pumps, temperature sensors, controllers, and the like as well as intricate or convoluted flow paths within the mold sections. These circuits can be designed to distribute the heat transfer fluid in a way that desirably controls the molding surface temperatures, e.g., temperatures along the surfaces of the part forming mold cavity, and injection channel(s). Thus the heat transfer fluid can be used to maintain a desired temperature distribution throughout the mold section, particularly along the surfaces of the part forming mold cavity. These circuits can be efficiently sized and designed to precisely achieve the desired molding surface temperatures, but can be expensive to the design and manufacture.

Some examples maintain molding surfaces nearly isothermal. Such an approach can rely on large fluid flows, secondary heat exchangers, and other approaches that add cost, and can decrease cycle time.

These heat transfer methods work well with pliable metal mold sections because the heat transfer circuits can be easily formed into metal sections using conventional techniques, including, but not limited to, machining, drilling, stamping, pressing, and the like, and because metal mold sections can provide high heat conduction between the melt and the heat transfer fluid.

Apart from formability and heat transfer, another important property, which can be considered in selecting a material of construction for the mold sections, is the useful life of the mold section. Soft metals (e.g., aluminum) can be used in relatively short-lived manufacturing operations, but can be ill-suited for long term manufacturing use due to their comparatively low wear resistance in comparison to hardened steel. Similarly, hardened steel can have inferior wear resistance and ductility (leading to issues with long term dimensional control of molded parts) in comparison to ceramic materials.

The useful life of a molding surface can be determined by its ability to maintain the shape of the finished part within dimensional requirements of the part. Through repeated thermal cycling, and use, as in surface-to-surface contact and pressing, metal molding surfaces can wear and can eventually result in out-of-tolerance parts, i.e., parts which do not conform to the established dimensional tolerances of the molded part. Ceramic materials can offer superior hardness and abrasion resistance in comparison to metals, properties that can be attributed to the microstructure of the ceramic material. These properties can contribute to superior durability and excellent wear resistance, which result in longer useful service life for molding surfaces made of ceramics in comparison to molding surfaces made of metal.

Ceramics offer high rigidity, or stiffness (i.e., Young's modulus), in comparison to metals which can reduce deflection and/or deformation when a ceramic is under load. This property contributes to ceramics ability to maintain close dimensional tolerances over a long time, and enables the ability to mold thin cross sections and intricate shapes.

Another property of ceramics which can be exploited for molding operations is the wide variety of surface finishes not available with metals.

However, despite these beneficial properties, ceramics do not conduct heat well, and due at least in part to the high hardness and abrasion resistance it can be difficult and/or expensive to form heat transfer circuits in ceramic mold sections. Because of these properties, ceramics have not seen wide scale adoption in molding operations, despite their other advantages over metals such as superior wear resistance, dimensional control, and variety of surface finish. To overcome these drawbacks a ceramic mold section can include a thermoelectric device which can be used to control temperatures throughout the mold section.

In some thermoelectric devices, when direct current (DC) passes through a circuit of heterogeneous conductors, heat can be released or absorbed at the conductors' junctions. The amount of heat released or absorbed is proportional to the current that passes through the conductors. Whether a junction is "hot" or "cold" depends on the direction of the current flow, i.e., the polarity of the circuit. This phenomenon is used in thermocouples, where the temperature gradient drives a current flow through the device and the resulting voltage difference can be correlated to a temperature at a junction.

Thermoelectric devices as used herein refer to devices capable of converting a voltage gradient into a temperature gradient and vice versa. Thermoelectric devices can include interface between dissimilar materials. These dissimilar materials can include metals, ceramics, semiconductors, and any materials which demonstrate the Peltier effect (the presence of heating or cooling at an electrified junction of two different conductors). Thermoelectric devices can include nano-materials, such as nanostructured superlattices, quantum wells, and single crystal silicon nanowires. Thermoelectric devices which operate using thermotunneling fall within the present scope.

A mold section can include a thermoelectric device disposed in thermal communication with the molding surface which can contact the melt during the molding process.

A thermoelectric device can be used to form the molding surface, or face, of the mold section which can contact the melt during molding. Alternatively, a thermoelectric device can be inserted in the mold sections, in cavities, where it can be in thermal communication with the mold section and molding surfaces which can contact the melt during molding (i.e. the walls of a part forming mold cavity and injection passage). In this way, a thermoelectric device can be disposed and/or configured in a way to provide heating and cooling to the melt. Thermoelectric devices can be stacked, one on top of another, adjacent to another, and/or affixed to another, or otherwise configured in thermal communication with one another to multiply the cooling and/or heating effect.

Thermoelectric devices can be placed within a ceramic mold section, in thermal communication with only selected portions of the molding surface, to provide discrete temperature control to a localized section of the molding surface. In this way, volumes and/or areas of the melt can be cooled and/or heated in a desired order, more or less rapidly, to a different temperature, and/or at a different rate than other volumes and/or areas of the melt.

Cavities for holding thermoelectric device inserts can be formed in ceramic mold sections from any side of the mold section, including the molding surface of the section. In particular, thermoelectric devices disposed in cavities formed in the mold section can be easily accessed for routine maintenance and/or overhaul, as in repair or replacement. Thermoelectric devices can be located within the volume of the mold section, as in a distance closer or further from the melt, to affect the temperature at a location of the mold section and/or the rate that thermal energy is transferred between the thermoelectric device and the melt.

A ceramic mold section can be formed with metal inserts. These metal inserts can provide a heat transfer pathway between areas/volumes of the mold section. These pathways can be used to transfer thermal energy between volumes or areas of the mold section, for example, between a molding surface, thermoelectric device disposed in the mold section, and/or a heat transfer fluid passage within the mold section.

Hybrid mold sections, of ceramic and metal, can advantageously combine features of each material. The metal inserts can provide defined heat flow pathways within the ceramic mold section. While the ceramic portions can provide high hardness and abrasion resistance, particularly to the molding surface or other contacting parts within the mold apparatus, such that the mold apparatus can meet the part tolerance requirements for a longer service life in comparison to a mold apparatus with equivalent metal portions.

Thermoelectric devices can be disposed in a mold section in thermal communication with a heat transfer fluid passage to allow for cooling or heating the thermoelectric device and/or of a single side of the thermoelectric device. A heat transfer fluid can be used in conjunction (together) with a thermoelectric device in a molding operation, such that both a thermoelectric device and a heat transfer fluid can exchange thermal energy with the molding surfaces (and melt) simultaneously. In this case, the exchange of thermal energy can be different for the thermoelectric device and the heat transfer fluid, for example, the thermoelectric device can heat while the heat transfer fluid cools the melt, or portions of the melt, and vice versa.

During the melt introduction stage a thermoelectric device can act to keep the mold section and/or molding surface adiabatic, or nearly adiabatic, where no, or very little, thermal energy is transferred from the melt to the molding surface. In this way, a thermoelectric device can serve to keep the melt in a liquid, molten or flowable state, to ensure the entire mold cavity is filled with material to be molded. In other words, a thermoelectric device can be used to reduce the amount of the melt which solidifies on the molding surface, thereby reducing the amount of flow area blocked by solidified melt, and reducing the pressure required to fill the entire volume of the part forming mold cavity.

For example, during the melt introduction phase a thermoelectric device can be operated with a first polarity (i.e., direction of current flow) to generate heat at a thermoelectric device junction, called the "hot" junction. The "hot" junction can be in thermal communication with a molding surface. In this way the thermoelectric device can transfer thermal energy into the flow passages of the mold, including the sprue, runner, gate, and part forming mold cavity, and can keep the melt flowing, (e.g., as in a molten, liquid, or flowable state) reducing the occurrence of melt solidification along a molding surface. Thus the flow area available for the melt, e.g., sprue, runners, gate, and part forming cavity, can be free of blockage or obstruction due to solidified material. In other words, the heating can keep the melt flowing, particularly within the flow passage(s) and along molding surfaces. Because the melt can flow more freely during melt introduction, due to greater flow area and reduction in the amount of material which solidifies, the injection pressure can be reduced without introducing part defects. Lowering the injection pressure can reduce operating cost by reducing energy consumption of pressing related equipment (e.g. hydraulic pump, motor, pneumatic pump, and the like). Lowering the injection pressure can reduce capital cost by reducing the design pressure of the mold sections, pressers, injectors, and other parts of the molding apparatus. Lowering the injection pressure can increase the useful life or a mold apparatus by reducing the wear on molding surfaces per cycle.

Once melt introduction is complete a thermoelectric device can be operated with a second polarity (i.e., second direction of current flow), opposite the first polarity, to reverse the temperature gradient across the thermoelectric device. Thus cooling the previously "hot" junction and, simultaneously, heating the previously "cold" junction. In this way, the temperature of the previously "hot" junction, which can be in thermal communication with molding surfaces, starts to cool and in turn cools the molding surfaces. This can draw thermal energy out of the mold and out of the material to be molded (i.e., the melt).

A thermoelectric device can improve thermal control by providing direct, local, control of molding surface temperatures, rapid response time, and narrow temperature operating ranges, without complicated and comparatively slow fluid controls (valves, pumps, heaters, fans, and the like). The use of a thermoelectric device within ceramic mold sections can be further advantaged by ceramics lack of electrical conductivity. Unlike metal, mold sections made of ceramic will not short out thermoelectric devices and therefore the use of thermoelectric devices within ceramic mold sections does not cause undue complexity to the mold design or to the design of the thermoelectric device.

A thermoelectric device can be disposed in electrical communication with an electrical control system. The electrical control system can provide power and regulation of the electric current flowing to and/or through the thermoelectric device. The electrical control system can, generally, include a power source, power conditioner, and controller, as well as wiring to conduct power, communication, sensor, and/or control signals. The electrical control system can, more specifically, include a power transformer, alternating current (AC) power source, AC/DC converter, DC power source, voltage converter, power regulator, current regulator, voltage regulator, feedback signals (e.g., temperature, pressure, material flow, current, voltage, power, and the like), and a microprocessor, controller, programmable logic controller, or other type of logic controller.

Feedback signals can originate from a direct measurement device (e.g., a thermocouple, voltmeter, mass flow meter, volume flow meter, current clamp, and the like) or can originate from a calculated parameter or property (e.g., enthalpy, viscosity, density, and the like). Feedback signals can be used to improve the accuracy, response time and ultimately the efficiency of the thermoelectric device, and can be used in the electrical control system to control the amount and/or direction of electric current flow through the thermoelectric device.

Temperature measurement devices can include a thermocouple, thermistor, resistance thermometer, UV sensor, and other temperature measuring devices.

A controller can be used to drive the error between a desired temperature (i.e., temperature setpoint) and a thermoelectric device junction temperature, molding surface temperature, or temperatures indicative thereof, or any desired control temperature, to zero. The controller can use any suitable control algorithm to drive the error between the setpoint and the actual measured parameter to zero, for example, the algorithm can include proportional error, integral error, differential error, or a combination including at least one of the foregoing, as in, for example, a proportional-integral-differential (PID) control algorithm. The controller can use any type of intelligent control techniques, including, for example, neural networks, Bayesian probability, fuzzy logic, machine learning, and evolutionary computation. Alternatively, the electrical control system can be manually controlled.

Ceramic molds as disclosed herein can be used to mold many different types of molding materials, including metal, glass, thermoplastic polymer, thermoset polymer, and combinations comprising at least one of the foregoing. The molding materials can include polymeric materials. Some examples of polymeric materials include thermoplastic materials such as polybutylene terephthalate (PBT); polyetherimides (PEI); acrylonitrile-butadiene-styrene (ABS); polycarbonate (PC); polycarbonate/PBT blends; polycarbonate/ABS blends; copolycarbonate-polyesters; blends of polycarbonate/polyethylene terephthalate (PET)/PBT; as well as combinations comprising at least one of the foregoing. The polymer material can include additives, such as impact modifier, ultraviolet light absorber, pigment, or a combination of one of the foregoing. The molding materials can include reinforcing materials, such as glass, carbon, basalt, aramid, or combination comprising at least one of the foregoing. Reinforcing materials can include cut, chopped, strand fibers, or a combination comprising at least one of the foregoing. For example, the material can be PC/PBT, a polyolefin (e.g., polypropylene such as glass filled polypropylene, long glass fiber polypropylene, etc.) as well as combinations comprising at least one of the foregoing.

In the molding operation the mold sections can be closed while a shot (amount of molding material needed to fill the passages and part forming mold cavity) of melt is prepared for injection (e.g., heated and moved into an injector). During this pre-injection phase, a thermoelectric device can be operated by an electronic control system with a first polarity so as to heat the junctions of the thermoelectric device which are in thermal communication with a molding surface. The amount of electric current flowing through the thermoelectric device can be controlled, such that the hot junctions of the thermoelectric device are at a temperature greater than or equal to the glass transition temperature of the material to be molded, to keep the material flowing during introduction.

As a shot of melt is introduced into the mold cavity, a thermoelectric device can continue to operate with a first polarity i.e., heating a molding surface, or maintaining the temperature of the molding surface, to keep a majority of the melt in a non-solid state, to reduce the amount of solidification, and keep the molding space substantially free from restriction/obstruction due to solidification. In this case, substantially free means that a thermoelectric device can operate to maintain less than or equal to 5% reduction in total flow area, for example, 0.1% to 2%, or, 0.1% to 1% reduction in total flow area in a melt injection passage.

Once the shot is introduced into the mold, and the part forming mold cavity is filled with material, the injector maintains a pressure of the melt within the molding space as the melt solidifies into the form of the molded part; this stage is referred to as solidification. During solidification the flow of electric current from the electrical control system through the thermoelectric device can be reversed, such that the thermoelectric device can be operated with a second polarity (opposite the first polarity). In this way, the junctions of the thermoelectric device which were hot during melt introduction phase can start to cool. These junctions, in thermal communication with a molding surface and contacting the melt, can remove thermal energy from the melt during the solidification process.

During any stage of the molding operation, a heat exchange fluid circuit can be operated to exchange thermal energy between a thermoelectric device, a mold section, including a molding surface, or other components of the molding apparatus, and the heat transfer fluid.

The temperature of the molding surface in contact with the melt can be lowered below the glass transition temperature of the material to be molded. A thermoelectric device and/or a fluid heat exchange circuit can operate, together or separately, to cool the melt during solidification. Once the temperature of the melt has dropped below the glass transition temperature of the material to be molded the mold can be opened and the molded part can be exited, i.e., removed or ejected, from the mold cavity.

After exiting the mold, the molded part can cool to room temperature and/or undergo further processing. Once the molded part has been formed, the part can be further processed, or finish-processed, to form a finished part. Finish-processing operations can include removing material from the part, and/or reforming the part chemically, mechanically, and/or thermally, for example, post-consolidation processing can include abrasive blasting, breaking, buffing, burnishing, cutting, drilling, etching, eroding, grinding, indenting, machining, marking, polishing, sanding, scoring, shaping, threading, trimming, tumbling, vibrating, and/or otherwise creating surface treatments, or a combination including at least one of the foregoing. Finish-processing operations can also include adding material to the part, for example, overmolding, remolding, back-molding, adding (i.e., applying) coatings, as in sealers, glazes, paints, functional layers, markings, and/or other surface additives to the part, or a combination of at least one of the foregoing. Types of coatings can include abrasion resistant, adhesive, antimicrobial, catalytic, decorative, electrically or thermally conductive, electrically or thermally non-conductive, light sensitive, non-adhesive, optical, primers, ultra-violet protective, waterproof, or a combination comprising at least one of the foregoing.

FIG. 1 shows an illustration of an injection molding apparatus 10 having thermoelectric devices 30 disposed therein. Two ceramic mold sections 20 are attached to platens 18, which are attached to a pressing device. The pressing device can be hydraulic, pneumatic, electric, mechanical, and the like and can act to bring the platens 18 together to form a molding space, including a part forming mold cavity 22 between the ceramic mold sections 20. The mold sections 20 include heat exchange fluid passages 28, or channels. The channels can be disposed in fluid communication with a heat exchange circuit. The channels can be disposed in thermal communication with a heat exchange circuit. The channels can be disposed in fluid and thermal communication with a heat exchange circuit. A heat exchange circuit can include a separate heat exchanger for transferring thermal energy between the heat transfer fluid.

Two thermoelectric devices 30 are disposed in electrical communication with an electrical control system 40. The electrical control system 40 uses a controller 50 to interpret temperature measurements from temperature sensors 46 and control the delivery of current (i.e., power) from a power source 42, through the power controller 48, and to the thermoelectric devices 30.

The thermoelectric devices 30 are in thermal communications with a molding surface 23 and the heat transfer fluid passages 28. A metal insert 27 can be disposed between a section of a thermoelectric device 30 and the heat exchange fluid passages 28 to provide a specific heat transfer pathway to augment the exchange of thermal energy between the thermoelectric device 30 and the heat exchange fluid.

Figure 2:
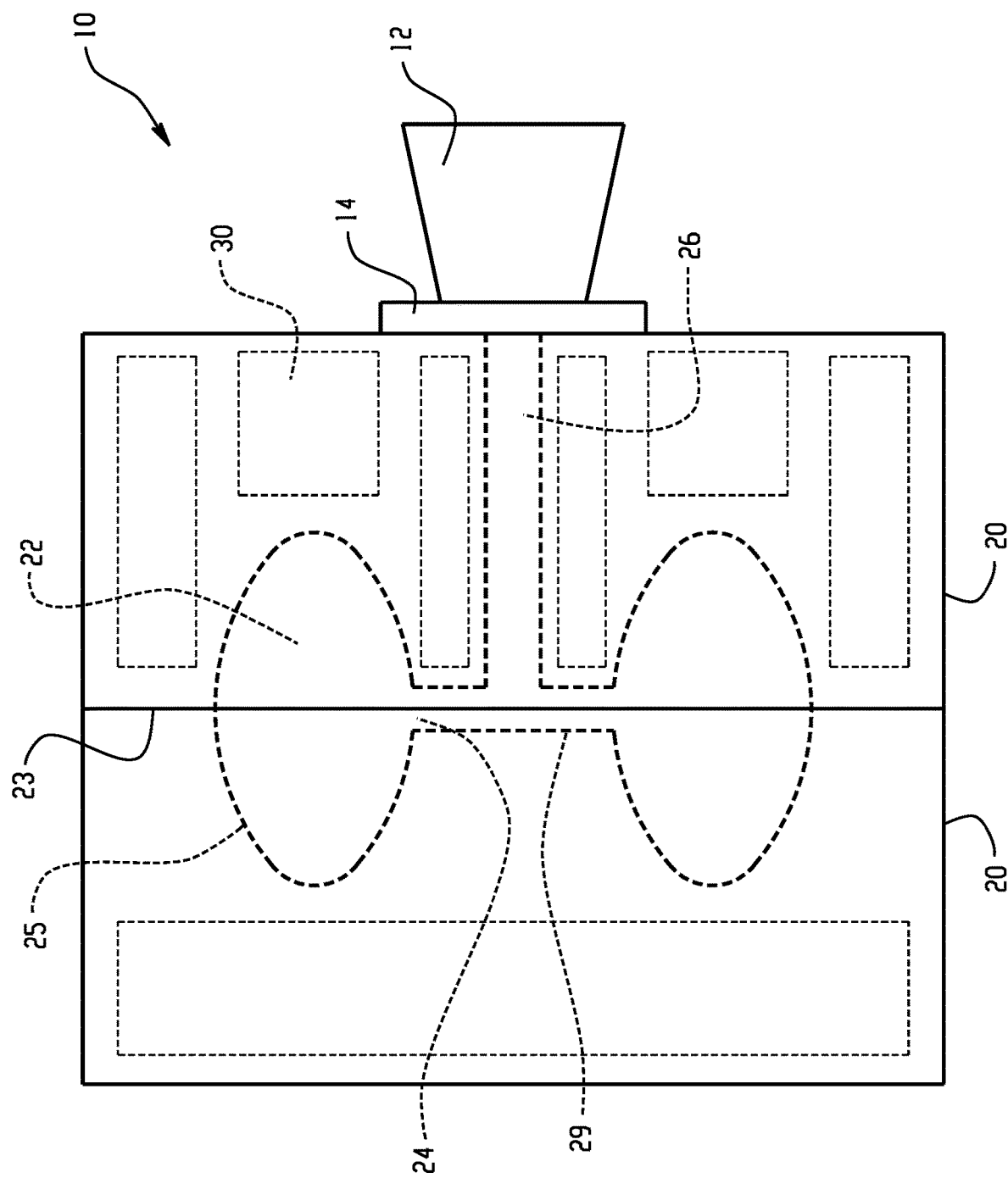
FIG. 2 is an illustration of a side view of a closed injection molding apparatus with thermoelectric devices.

FIG. 2 shows an illustration of a side view of an injection molding apparatus 10 having molding surfaces 23 of ceramic mold sections 20 pressed together to form a molding space 25 (region enclosed with dotted lines). The molding space is defined by two part forming mold cavities 22, a sprue 26, two runners 29, and two gates 24 which are formed between the molding surfaces 23 of the corresponding mold sections 20. A sprue bushing 14 is disposed between the sprue 26 and the injector 12. As the melt is injected from the injector 12 it flows through the sprue 26, through the runners 29, through the gates 24, and into the part forming mold cavities 22. Thermoelectric devices 30 can be used to heat the molding material during melt introduction and cool the molding material into a solid part during solidification.

Figure 3:
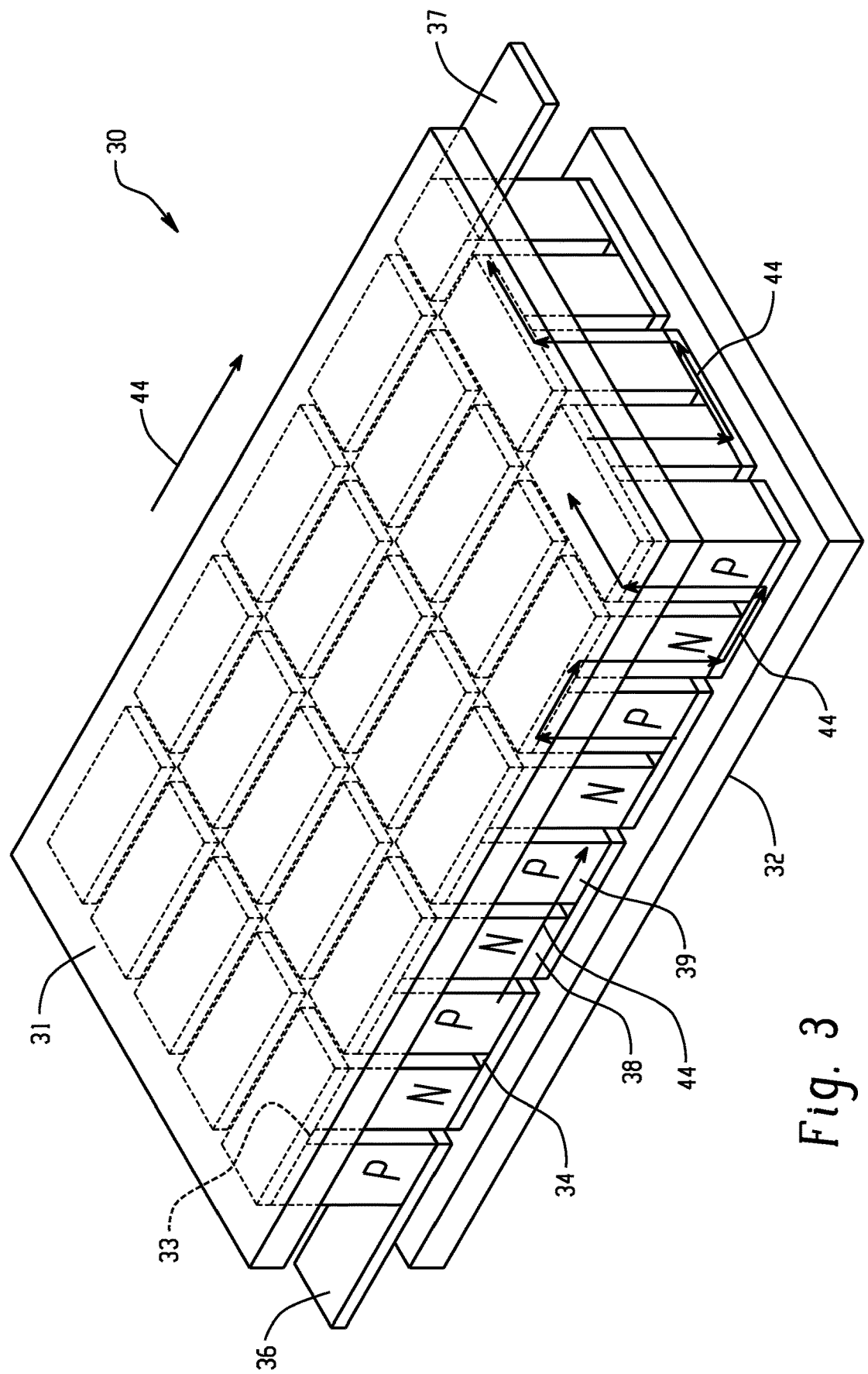
FIG. 3 is an illustration of a thermoelectric device.

FIG. 3 shows and illustration of a type of thermoelectric device 30. In this case, the thermoelectric device 30 is a semiconductor device having N-type semiconductors 38 and P-type semiconductors 39.

N-type and P-type semiconductors refer to extrinsic semiconductors which have been doped to impart different electrical properties. The N-type semiconductor has larger electron concentration than hole concentration (electron hole, absence of a negative-mass electron, or absence of an electron near the top valence band), whereas the opposite is true with P-type semiconductors which have a larger hole concentration than electron concentration.

In FIG. 3 the direction of electric current flow 44 is shown to be generally, from electrical connection 36 to electrical connection 37. When electric current flows along this path, the electrical connection 36 is the negative pole, and the electrical connection 37 is the positive pole. In this case, current flows from P-type to N-type semiconductors in junctions 33 adjacent to the top surface 31 and from N-type to P-type semiconductors in junctions 34 adjacent to the bottom surface 32. Current flowing from P-type to N-type semiconductors releases thermal energy, whereas current flowing from N-type to P-type semiconductors absorbs thermal energy. Thus, in this configuration the current flow will result in "hot" junctions 33 adjacent to the top surface 31 which will become hot, and "cold" junctions 34 adjacent to the bottom surface 32 which will become cold.

The "hot" and "cold" junctions can be reversed by reversing the direction of current flow through the thermoelectric device, e.g., by flowing current from electrical connection 37 to electrical connection 36. This is because when the current flow is reversed, current will flow from N-type to P-type semiconductors in junctions 33 adjacent to the top surface 31, and from P-type to N-type semiconductors in junctions 34 adjacent the bottom surface 32.

Figure 4:
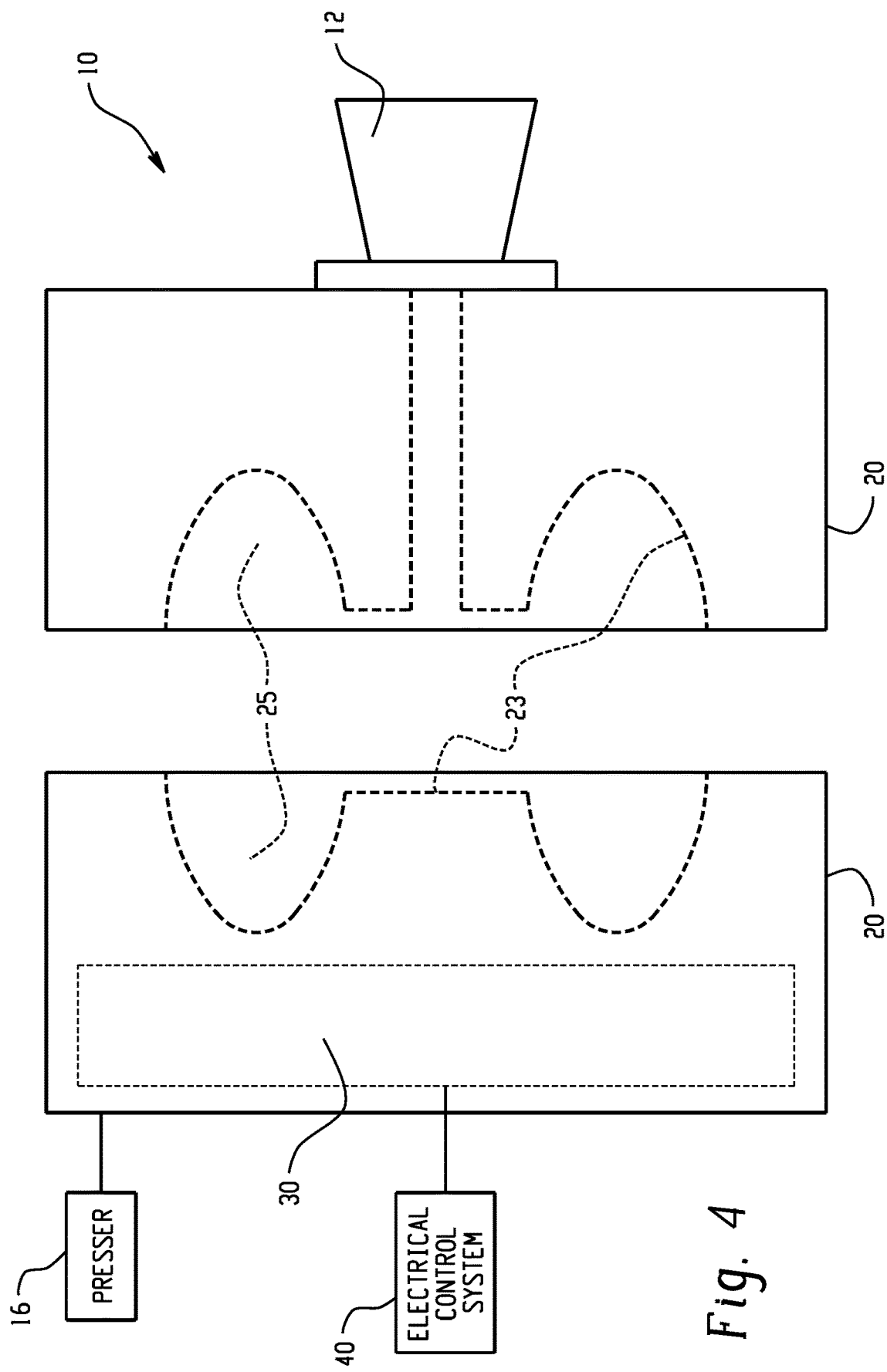
FIG. 4 is an illustration of a side view of an open injection molding apparatus with a thermoelectric device.

FIG. 4 shows an illustration of a side view of an injection molding apparatus 10 having molding surfaces 23 (represented by dotted lines) of mold sections 20 spaced apart from one another. A presser 16 can be disposed in mechanical communication with a first mold section 20 and can be configured to move at least one of the first and second mold sections 20 toward the other to define a molding space 25. The molding space 25 is defined by the molding surfaces 23 of the corresponding mold sections 20 once the mold sections are brought together. An injector 12 is positioned next to a channel through a mold section 20 for introducing molding material to the mold. As the melt is injected from the injector 12 it flows into the molding space 25. A thermoelectric device 30 can be used to heat a molding surface 23 during melt introduction and cool the molding surface 23 during solidification. An electrical control system 40 can be disposed in electrical communication with the thermoelectric device 30.

Embodiment 1

An injection molding apparatus comprising: a first mold section comprising a first molding surface, wherein the first mold section is configured for attachment to a presser; a second mold section comprising a second molding surface and disposed opposite the first mold section, wherein the first and second molding surfaces face one another; a thermoelectric device disposed in one of the first and second mold sections and in thermal communication with at least one of the first and second mold surfaces; an electrical control system disposed in electrical communication with the thermoelectric device; the presser in mechanical communication with the first mold section and configured to move at least one of the first and second mold sections toward the other to define a molding space; and an injector for introducing a material to be molded into the molding space; wherein at least one of the first and second mold sections is formed from a ceramic material.

Embodiment 2

The injection molding apparatus of Embodiment 1, wherein the presser is configured to move the first mold section toward the second mold section, and wherein the second mold section is stationary.

Embodiment 3

The injection molding apparatus of Embodiment 1, wherein the presser moves both the first and second mold sections together.

Embodiment 4

The injection molding apparatus of any one of Embodiments 1-3, wherein both the first and second mold sections are formed from a ceramic material.

Embodiment 5

The injection molding apparatus of any one of Embodiments 1-4, wherein the electrical control system is configured to reverse a direction of an electric current flow through the thermoelectric device.

Embodiment 6

The injection molding apparatus of any one of Embodiments 1-5, wherein at least one of the first and second mold sections comprise a heat exchange fluid passage disposed in thermal communication at least one of the first and second molding surfaces.

Embodiment 7

The injection molding apparatus of any one of Embodiments 1-6, wherein at least one of the first and second mold sections comprise a heat exchange fluid passage and a metal material, and wherein the metal material is disposed in thermal communication with the thermoelectric device and the heat exchange fluid passage.

Embodiment 8

The injection molding apparatus of any one of Embodiments 1-7, wherein at least one of the first and second mold sections comprise a metal material, and wherein the metal material is disposed in thermal communication with the thermoelectric device and the molding surface.

Embodiment 9

The injection molding apparatus of any one of Embodiments 1-8, wherein at least one of the first and second mold sections further comprises a cavity therein, and wherein the thermoelectric device is disposed in the cavity.

Embodiment 10

The injection molding apparatus of any one of Embodiments 1-8, wherein the first mold section comprises a thermoelectric device disposed therein and in thermal communication with the first mold surface and the second mold section comprises a thermoelectric device disposed therein and in thermal communication with the second mold surface.

Embodiment 11

The injection molding apparatus of any one of Embodiments 1-10, wherein the electrical control system comprises a power source, a power conditioner, a controller, or a combination of at least one of the foregoing.

Embodiment 12

The injection molding apparatus of any one of Embodiments 1-11, wherein the thermoelectric device comprises metals, ceramics, semiconductors, nanostructured superlattices, quantum wells, nano-materials, single crystal silicon nanowires, or a combination comprising at least one of the foregoing.

Embodiment 13

A method of injection molding comprising: forming a molding space between two mold sections, wherein at least one of the mold sections is made of a ceramic material; heating at least one of the mold sections with a thermoelectric device by flowing an electric current through the thermoelectric device in a first direction; introducing a material to be molded into the molding space; cooling the material to be molded to form a molded part; exiting the part from the part forming mold cavity.

Embodiment 14

A method of injection molding using the apparatus of any of Embodiments 1-12, comprising: heating at least one of the mold sections with a thermoelectric device by flowing an electric current through the thermoelectric device in a first direction; introducing a material to be molded into the molding space; cooling the material to be molded to form a molded part; exiting the part from the part forming mold cavity.

Embodiment 15

The method of any one of Embodiments 13-14, wherein cooling the material to be molded comprises: flowing a heat transfer fluid through a heat transfer passage formed in at least one of the mold sections, flowing an electric current through the thermoelectric device in a second direction opposite the first direction, or a combination comprising at least one of the foregoing.

Embodiment 16

The method of any one of Embodiments 13-15, wherein cooling the material to be molded comprises flowing an electric current through the thermoelectric device in a second direction opposite the first direction.

Embodiment 17

The method of any one of Embodiments 13-16, wherein the material to be molded is a plastic material.

Embodiment 18

An injection molding apparatus comprising: a first mold section comprising a first molding surface, wherein the first mold section is configured for attachment to a presser; a second mold section comprising a second molding surface and disposed opposite the first mold section, wherein the first and second molding surfaces face one another; a first thermoelectric device disposed in the first mold section and in thermal communication with the first mold surface; a second thermoelectric device disposed in the second mold section and in thermal communication with the second mold surface; an electrical control system disposed in electrical communication with both the first and second thermoelectric devices; the presser in mechanical communication with the first mold section and configured to move the first mold section toward the second mold section to define a molding space, wherein the second molding surface is stationary; and an injector for introducing a material to be molded into the molding space; wherein at least one of the first and second mold sections is formed from a ceramic material.

Embodiment 19

The injection molding apparatus of Embodiment 18 wherein both the first and second mold section is formed from a ceramic material.

Embodiment 20

The injection molding apparatus of any one of Embodiments 18-19, wherein at least one of the first and second mold sections comprise a heat exchange fluid passage disposed in thermal communication with at least one of the first and second molding surfaces.

Embodiment 21

The injection molding apparatus of any one of Embodiments 18-20 wherein the electrical control system is configured to reverse a direction of an electric current flow through at least one of the first and second thermoelectric devices.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "some embodiments", "some embodiments", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. An injection molding apparatus comprising:
   a first mold section comprising a first molding surface, wherein the first mold section is configured for attachment to a presser;
   a second mold section comprising a second molding surface and disposed opposite the first mold section, wherein the first and second molding surfaces face one another;
   a thermoelectric device disposed in one of the first and second mold sections and in thermal communication with at least one of the first and second mold surfaces;
   an electrical control system disposed in electrical communication with the thermoelectric device;
   the presser in mechanical communication with the first mold section and configured to move at least one of the first and second mold sections toward the other to define a molding space; and
   an injector for introducing a material to be molded into the molding space;
   wherein at least one of the first and second mold sections is formed from a ceramic material; and
   a heat transfer fluid disposed in at least one of the first and second mold sections and in thermal communication with at least one of the first and second mold surfaces, wherein the thermoelectric device and the heat transfer fluid are configured to simultaneously exchange different thermal energies with at least one of the first and second molding surfaces, and wherein the thermoelectric device and the heat transfer fluid are configured to keep a portion of material in the molding space in a non-solid state for a period of time while another portion of material in the molding space is in a solid state.

2. The injection molding apparatus of claim 1, wherein the presser is configured to move the first mold section toward the second mold section, and wherein the second mold section is stationary.

3. The injection molding apparatus of claim 1, wherein the presser moves both the first and second mold sections together.

4. The injection molding apparatus of claim 1, wherein both the first and second mold sections are formed from a ceramic material.

5. The injection molding apparatus of claim 1, wherein the electrical control system is configured to reverse a direction of an electric current flow through the thermoelectric device.

6. The injection molding apparatus of claim 1, wherein at least one of the first and second mold sections comprise a heat exchange fluid passage disposed in thermal communication with at least one of the first and second molding surfaces.

7. The injection molding apparatus of claim 1, wherein at least one of the first and second mold sections comprise a heat exchange fluid passage and a metal material, and wherein the metal material is disposed in thermal communication with the thermoelectric device and the heat exchange fluid passage.

8. The injection molding apparatus of claim 1, wherein at least one of the first and second mold sections comprise a metal material, and wherein the metal material is disposed in thermal communication with the thermoelectric device and the molding surface.

9. The injection molding apparatus of claim 1, wherein at least one of the first and second mold sections further comprises a cavity therein, and wherein the thermoelectric device is disposed in the cavity.

10. The injection molding apparatus of claim 1, wherein the first mold section comprises a thermoelectric device disposed therein and in thermal communication with the first mold surface and the second mold section comprises a thermoelectric device disposed therein and in thermal communication with the second mold surface.

11. The injection molding apparatus of claim 1, wherein the electrical control system comprises a power source, a power controller, a controller, or a combination of at least one of the foregoing.

12. The injection molding apparatus of claim 1, wherein the thermoelectric device comprises metals, ceramics, semiconductors, nanostructured superlattices, quantum wells, nano-materials, single crystal silicon nanowires, or a combination comprising at least one of the foregoing.

13. A method of injection molding using the injection molding apparatus of claim 1, comprising:
forming a molding space between the first mold section and the second mold section by pressing together using a presser, wherein at least one of the first mold section and the second mold section is made of a ceramic material;
heating at least one of the first mold section and the second mold section with the thermoelectric device by flowing an electric current through the thermoelectric device in a first direction;
introducing a material to be molded into the molding space;
simultaneously heating a portion of the material in the molding space while cooling another portion of the material in the molding space, wherein a portion of material in the molding space is kept in a non-solid state for a period of time while another portion of material in the molding space is in a solid state;
cooling the material to be molded to form a molded part; and
exiting the part from the part forming mold cavity.

14. The method of claim 13, wherein cooling the material to be molded comprises: flowing a heat transfer fluid through a heat transfer passage formed in at least one of the first mold section and the second mold section, flowing an electric current through the thermoelectric device in a second direction opposite the first direction, or a combination comprising at least one of the foregoing.

15. The method of claim 13, wherein cooling the material to be molded comprises flowing an electric current through the thermoelectric device in a second direction opposite the first direction.

16. The method of claim 13, wherein the material to be molded is a plastic material.

17. An injection molding apparatus comprising:
a first mold section comprising a first molding surface, wherein the first mold section is configured for attachment to a presser;
a second mold section comprising a second molding surface and disposed opposite the first mold section, wherein the first and second molding surfaces face one another;
a first thermoelectric device disposed in the first mold section and in thermal communication with the first mold surface;
a second thermoelectric device disposed in the second mold section and in thermal communication with the second mold surface;
an electrical control system disposed in electrical communication with both the first and second thermoelectric devices;
the presser in mechanical communication with the first mold section and configured to move the first mold section toward the second mold section to define a molding space, wherein the second molding surface is stationary; and
an injector for introducing a material to be molded into the molding space;
wherein at least one of the first and second mold sections is formed from a ceramic material;
a heat transfer fluid disposed in at least one of the first and second mold sections and in thermal communication with at least one of the first and second mold surfaces, wherein the thermoelectric devices and the heat transfer fluid are configured to simultaneously exchange different thermal energies with at least one of the first and second mold surfaces, and wherein the thermoelectric device and the heat transfer fluid are configured to keep a portion of material in the molding space in a non-solid state for a period of time while another portion of material in the molding space is in a solid state.

18. The injection molding apparatus of claim 17 wherein both the first and second mold section is formed from a ceramic material.

19. The injection molding apparatus of claim 17, wherein at least one of the first and second mold sections comprise a heat exchange fluid passage disposed in thermal communication with at least one of the first and second molding surfaces.

20. The injection molding apparatus of claim 17, wherein the electrical control system is configured to reverse a direction of an electric current flow through at least one of the first and second thermoelectric devices.

21. The injection molding apparatus of claim 1, wherein the thermoelectric device operates to maintain less than or equal to a 5% reduction in a total flow area within the injection molding apparatus.

* * * * *